April 29, 1930.  E. V LILLIAN  1,756,648
FLY TRAP
Filed May 12, 1928   2 Sheets-Sheet 1
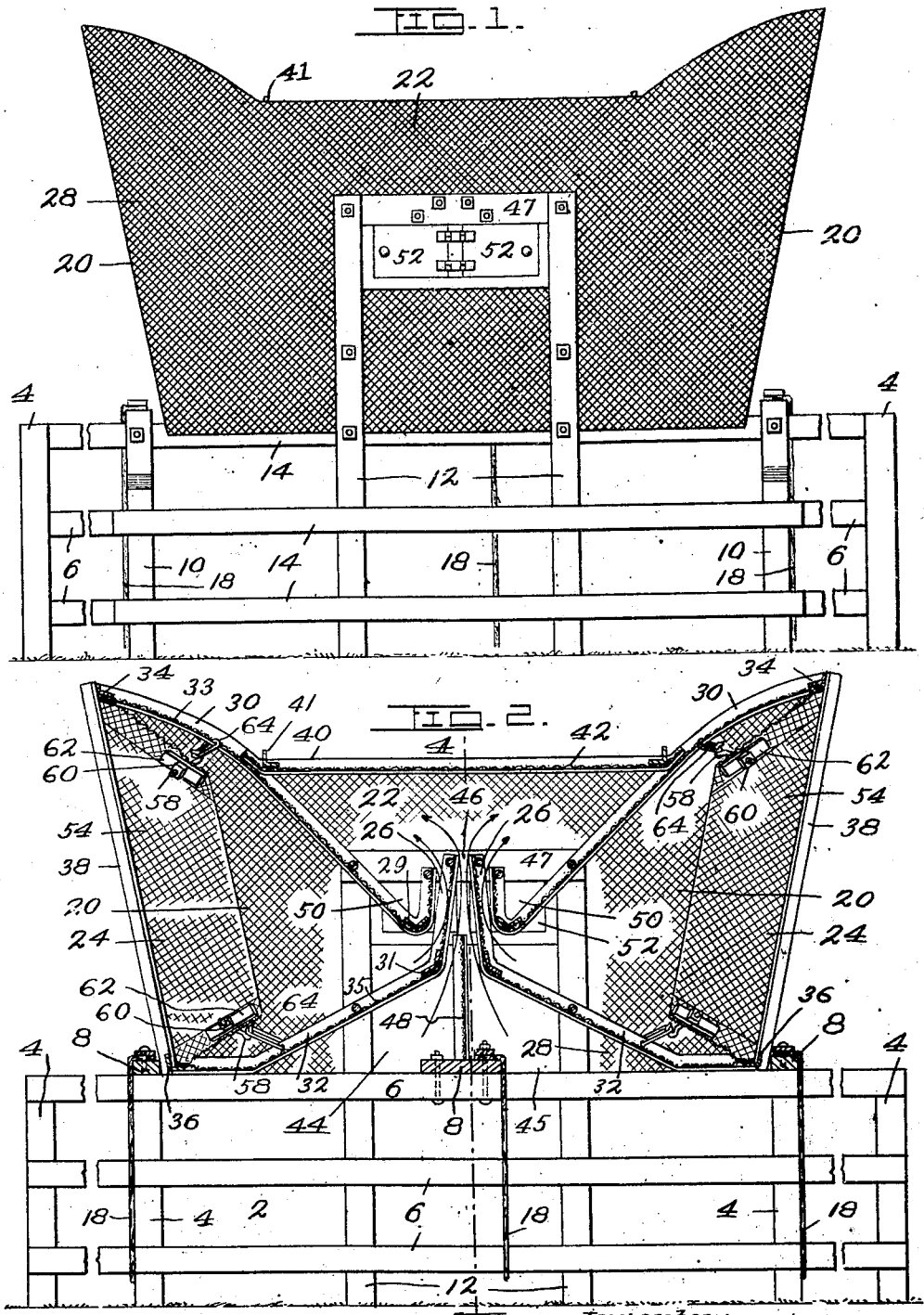
Witness:
Fred C. Fischer.
Inventor:
Emil V. Lillian,
By F. G. Fischer, Attorney.

April 29, 1930. E. V. LILLIAN 1,756,648
FLY TRAP
Filed May 12, 1928 2 Sheets-Sheet 2
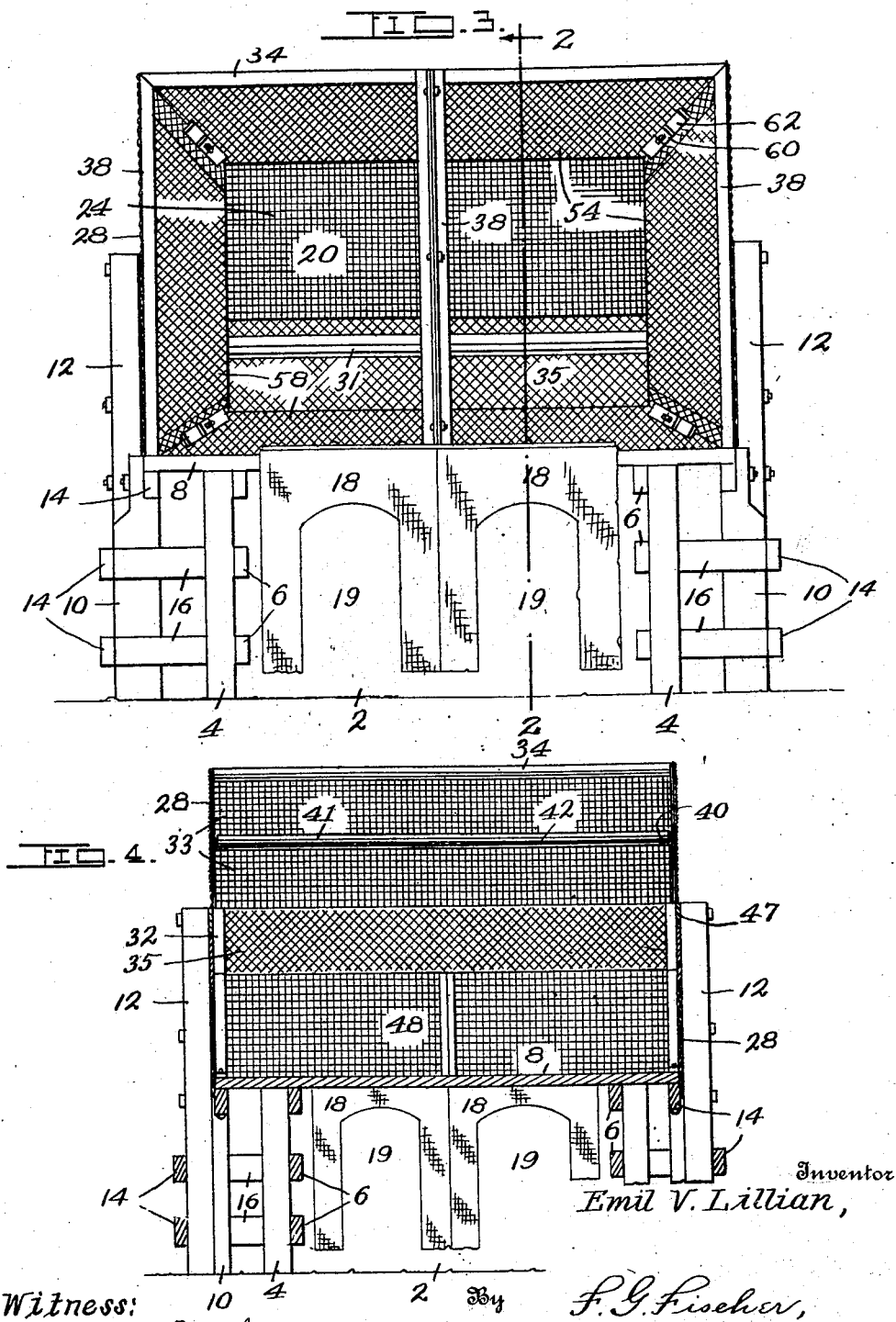

Patented Apr. 29, 1930

1,756,648

UNITED STATES PATENT OFFICE

EMIL V. LILLIAN, OF LINDSBORG, KANSAS

FLYTRAP

Application filed May 12, 1928. Serial No. 277,156.

My invention relates to fly traps and one object is to provide a structure of this character embodying novel means for brushing flies and other insects from live stock, a fly entrapping compartment, and means for gathering and directing the flies to said entrapping compartment after they have been brushed from the animals.

Other objects are to provide a structure through which a large number of animals may pass in a relatively short time to free themselves of flies and other insects, and which is strong, durable and inexpensive to manufacture and install.

In order that the invention may be readily understood, reference will now be had to the accompanying drawings, in which:

Fig. 1 is a broken side elevation of the structure.
Fig. 2 is a vertical longitudinal section on line 2—2 of Fig. 3, with a portion of the wire gauze broken away.

Fig. 3 is an end elevation of the structure.

Fig. 4 is a slightly reduced broken cross section on line 4—4 of Fig. 2.

Referring in detail to the different parts, 2 designates a longitudinal passageway consisting of two main frames which are preferably spaced apart a sufficient distance to permit the animals to pass through in double file. Each frame consists of a plurality of posts 4 set in the ground and united by longitudinal boards 6. Said frames also include transverse overhead beams 8 secured to the tops of the posts 4 and the uppermost boards 6.

The beams 8 extend laterally beyond the posts 4 and are secured to two auxiliary frames paralleling the main frames, from the outer sides of which they are spaced a short distance. Each auxiliary frame consists of a pair of end posts 10, a pair of intermediate posts 12 which are considerably longer than the end posts 10, and longitudinal boards 14 uniting the posts 10 and 12. The ends of the spaces between the main and auxiliary frames are closed by boards 16 secured to the end posts 10 and the adjacent posts 4 to prevent the animals from passing through said spaces.
18 designates a plurality of brushes arranged in the passageway 2 for brushing off the flies from the animals as they pass in either direction. The brushes 18 consist of suitable material, such for instance as burlap, and are arranged in pairs, one pair being suspended from the outermost beams 8 and another pair from the intermediate beam 8. Each brush 18 has an opening 19 conforming more or less to the cross section of the animals so that the margins of the openings 19 will brush the flies off the backs, sides and legs of the animals as they pass through.

The main and auxiliary frames support a pair of overhead chutes 20 and a fly entrapping compartment 22. The chutes 20 have large upwardly extending entrances 24 for collecting flies and taper inwardly to exits 26 which lead into the compartment 22. The chutes 20 consist of frames covered with wire gauze. Said frames comprise upper angle irons 30 extending downwardly and inwardly from the entrances 24 and thence upwardly to form a part of the exits 26, lower angle irons 32 extending inwardly and upwardly from the entrances 24, their inner ends extending upwardly adjacent to each other and the upturned inner ends of the angle irons 30 to form parts of the exits 26, transverse upper and lower angle irons 34 and 36 uniting the outer ends of the angle irons 30 and 32, respectively, angle irons 29 and 31 uniting the inner portions of the angle irons 30 and 32, respectively, and upwardly extending angle irons 38 connected at their upper ends to the angle irons 30 and 34 and at their lower ends to the angle irons 32 and 36, Fig. 2. The sides, tops and bottoms of the chutes 20 are enclosed with wire gauze 28, 33 and 35, respectively, secured to the frames just described and coacting with the upturned inner ends of the angle bars 30 and 32 in forming the exits 26.

The frame of the compartment 22 consists of the angle irons 30, longitudinal angle irons 40 secured at their ends to said angle irons 30, and transverse angle irons 41 secured at their ends to the angle irons 40. The sides of the receptacle 22 are enclosed with the wire gauze 28 and 33, and the top with wire gauze 42 secured to the angle irons 40 and 41.

A central chute 44 is formed by and between the chutes 20 and has a wide opening 45 at its lower portion communicating with the upper part of the passageway 2. The upper central portion of the chute 44 communicates with the compartment 22 through an exit 46 formed by the adjacent sides of the exits 26. The chutes 20 and 44 are reinforced and further secured to the top of the passageway 2 by the upper portions of the long posts 12 and cross bars 47, which latter unit the upper ends of said posts in pairs. The chute 44 is divided into two compartments by a transverse partition 48 extending upwardly from the intermediate beam 8 to within a suitable distance of the exit 46 and coacting with the bottoms of the chutes 20 in directing flies to said exit 46.

The exits 26 and 46 enable the flies to readily enter the receptacle 22 but the rough edges of said exits prevent the flies from turning back and escaping. The flies soon die after becoming empounded in the compartment 22 and fall into troughs 50 formed at the inner upper portions of the chutes 20. Doors 52 are located at the ends of the troughs 50 so that the dead flies can be readily removed.

Inwardly converging baffles 54 are arranged at the entrances 24 of the chutes 20, the outer portions of said baffles being secured to the angle irons 34, 36 and 38, while their inner ends are held taut by hooks 58 and links 64. The hooks 58 extend through the wire gauze forming the baffles 54 and are secured by nuts 60 which are prevented from pulling through the wire gauze by metal plates 62. The links 64 are secured to the angle irons 30 and 32.

With the parts arranged as shown and described it will be understood that when the animals are driven through the passageway 2 in double file they will, by rubbing against each other and the first brushes 18 encountered, brush off more or less of the flies, which, in endeavoring to follow the animals, will fly upwardly and enter the adjacent chute 20 which directs them into the compartment 22. Any remaining flies are brushed off by the intermediate brushes 18, and upon entering the middle chute 44 are directed thereby into the compartment 22.

Some of the flies entering the chute 20, will, on alighting upon the wire gauze forming the sides of said chute, endeavor to walk out through the entrance 24, but on encountering the associate baffle 54 will follow the path of least resistance and turn back to the exit 26 through which they will enter the compartment 22. The flies confined within the compartment 22 soon die and fall into the troughs 50 from which they can be removed through the openings normally closed by the doors 52. If the wind is blowing towards either entrance of the passageway 2 the animals are preferably driven with the wind so that it will blow the flies into the wide entrance of the adjacent chute 20 and thus materially aid in catching the flies as they are brushed from the animals while passing through the passageway.

From the foregoing description it is apparent that I have provided a fly trap embodying the advantages hereinbefore pointed out, and while I have shown a preferred form of my invention I reserve all rights to such changes and modifications thereof as properly fall within the spirit and scope of the invention as claimed.

Having thus described my invention, what I claim and desire to secure by Letters Patent, is:

1. A structure of the character described consisting of a passageway through which animals may pass, brush means arranged within said passageway for brushing insects from the animals, an insect catching compartment disposed above said passageway, a pair of oppositely disposed chutes arranged above said passageway for collecting and directing the insects to said compartment, the exit ends of said chutes being arranged adjacent to each other and communicating with the lower portion of the compartment, and a third chute arranged above the passage at a point between said pair of chutes and having an exit at its upper portion communicating with the compartment.

2. A structure of the character described consisting of a passageway through which animals may pass, means arranged within said passageway for brushing insects from the animals, an insect catching compartment disposed above said passageway and having troughs for the reception of dead insects, doors leading to said troughs, and a pair of oppositely disposed chutes for directing the flies to said compartment, the exit ends of said chutes being arranged adjacent to each other and communicating with the lower portion of the compartment.

3. A structure of the character described consisting of a passageway through which animals may pass, brush means arranged within said passageway for removing insects from the animals as they travel through said passageway, an insect entrapping compartment disposed above said passageway, a chute for directing the insects to said compartment as they are brushed from the animals, baffle means extending entirely around the entrance to said chute, and means for drawing said baffle means taut.

4. A structure of the character described consisting of a passageway through which animals may pass in either direction, brush means arranged within said passageway for removing insects from the animals as they travel through said passageway, an insect entrapping compartment disposed above said passageway, a chute for directing the insects to said compartment as they are brushed from the animals, wire gauze baffle means extending entirely around the interior of the entrance to said chute, the innermost end of said baffle means being spaced from the interior of the chute and its outermost end being secured to said chute, links secured to the interior of the chute, and threaded means connected to said links and the baffle means for drawing and holding the latter taut.

5. A structure of the character described consisting of a passageway through which animals may pass, an insect entrapping compartment disposed above and permanently secured to said passageway and formed into a trough at its lower portion for the reception of dead insects, a door through which access can be had to said trough, and means for collecting and directing insects into the entrapping compartment.

6. A structure of the character described consisting of two main frames spaced apart for the passage of animals, two auxiliary frames paralleling the outer sides of said main frame from which latter they are spaced, each auxiliary frame including a pair of long posts, and fly collecting and entrapping means mounted upon said frames and reinforced by the long posts.

In testimony whereof I affix my signature.

EMIL V. LILLIAN.